United States Patent
Yanagisawa et al.

(10) Patent No.: US 6,627,820 B2
(45) Date of Patent: Sep. 30, 2003

(54) ORGANIC COMPOSITE INSULATOR AND METHOD OF PRODUCING THE SAME

(75) Inventors: Takeshi Yanagisawa, Chiba (JP); Tokui Yonemura, Chiba (JP); Takao Nakano, Kanagawa (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/989,990

(22) Filed: Nov. 20, 2001

(65) Prior Publication Data

US 2002/0076517 A1 Jun. 20, 2002

(30) Foreign Application Priority Data

Nov. 21, 2000 (JP) ........................................ 2000-353949

(51) Int. Cl.$^7$ .............................................. H01B 17/36
(52) U.S. Cl. ............................ 174/140 R; 174/140 CR; 174/139; 174/137 R
(58) Field of Search ........................ 174/138 R, 138 F, 174/139, 168, 169, 176, 209, 211, 178, 142, 152 R, 152 E, 140 R, 140 CR; 313/143

(56) References Cited

U.S. PATENT DOCUMENTS

| | | | | |
|---|---|---|---|---|
| 3,604,830 A | * | 9/1971 | Frakes | 174/143 |
| 3,816,642 A | * | 6/1974 | Toedtman et al. | 174/138 F |
| 4,495,381 A | * | 1/1985 | Timoshenko et al. | 156/172 |
| 5,466,891 A | * | 11/1995 | Freeman et al. | 174/11 BH |
| 5,695,841 A | * | 12/1997 | Mazeika et al. | 174/176 |
| 6,307,157 B1 | * | 10/2001 | Fujii et al. | 174/176 |

FOREIGN PATENT DOCUMENTS

| | | | |
|---|---|---|---|
| JP | 60-193214 | | 10/1985 |
| JP | 64-24324 | * | 1/1989 |
| JP | 3-55615 | | 5/1991 |
| JP | 9 251816 | | 9/1997 |
| JP | 11 312426 | | 11/1999 |

* cited by examiner

Primary Examiner—Anthony Dinkins
Assistant Examiner—Jinhee J Lee
(74) Attorney, Agent, or Firm—Knobbe Martens Olson & Bear LLP

(57) ABSTRACT

An organic composite insulator (tube) and method for production thereof giving an external flashover characteristic, enabling a reduction of the cost, and enabling a reduction of the size of the insulator. The outside diameters of the insulator sheath body and watersheds at only the intermediate insulator sheath (3c) corresponding to the vicinity of the tip (6a) of the top of the inside electrode (6) are made larger than the outside diameters of the body and watersheds of the upper and lower insulator sheaths (3a) and (3b). The electric field of the sheath surface in the vicinity of the tip (6a) of the top of the inside electrode (6) exhibiting the maximum electric field in the large size insulator is weakened and the maximum electric field part is moved to the top portion of the sheath body and watersheds enlarged in inside diameter. Further, the insulator act to block the propagation of the air dielectric breakdown occurring at the maximum electric field part to the ground side end fitting (2') and thereby to increase the external flashover voltage.

10 Claims, 11 Drawing Sheets

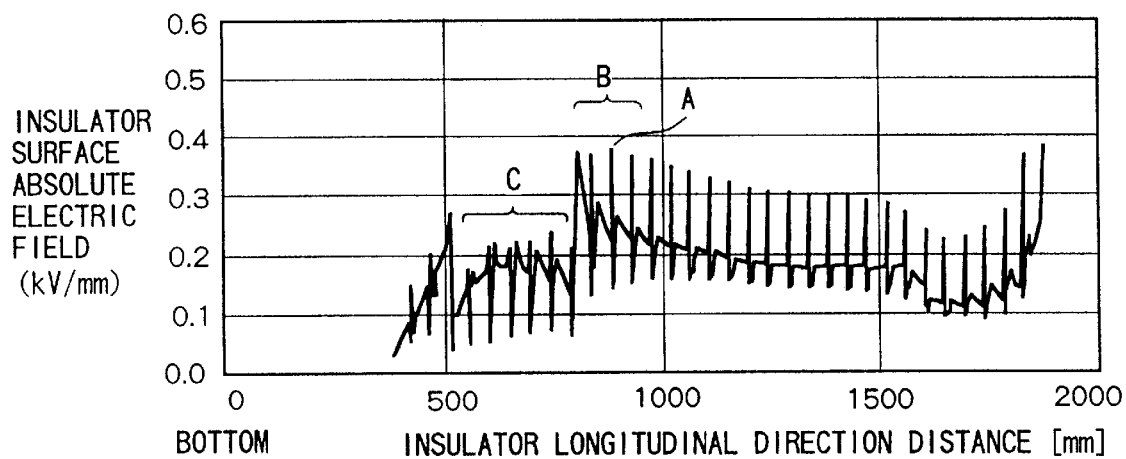
FIG.9   L=1700mm  φ=248mm
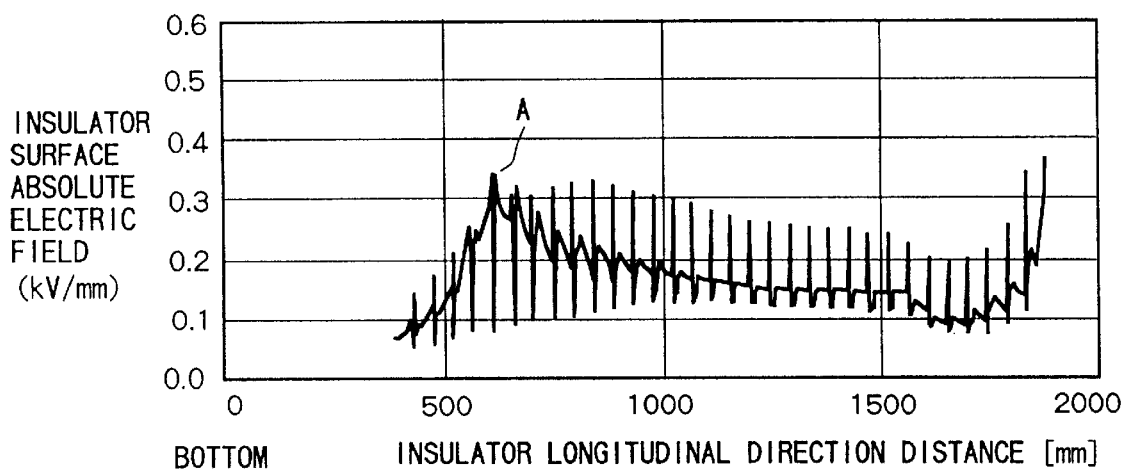
FIG.10 (Prior Art)   L=1700mm  φ=300mm

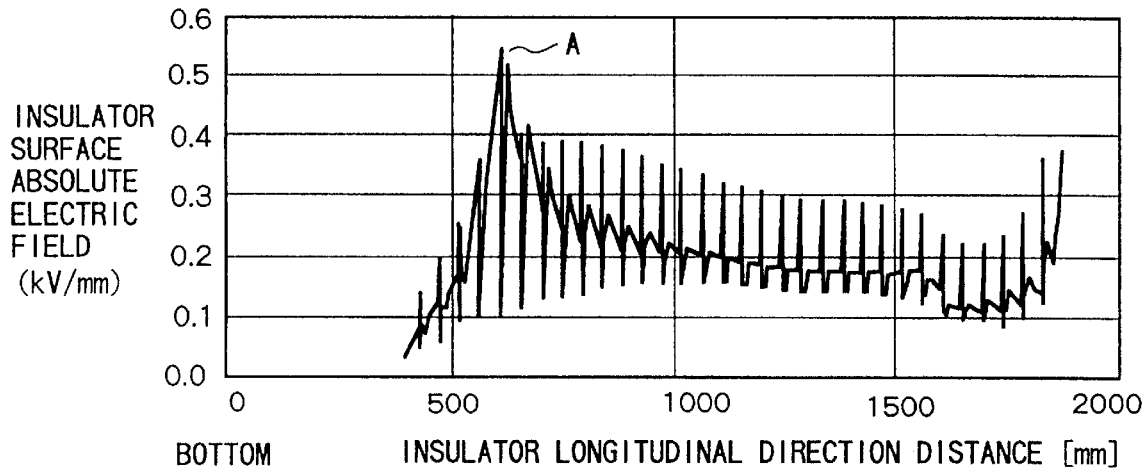
FIG.11 (Prior Art)  L=1700mm  φ=248mm
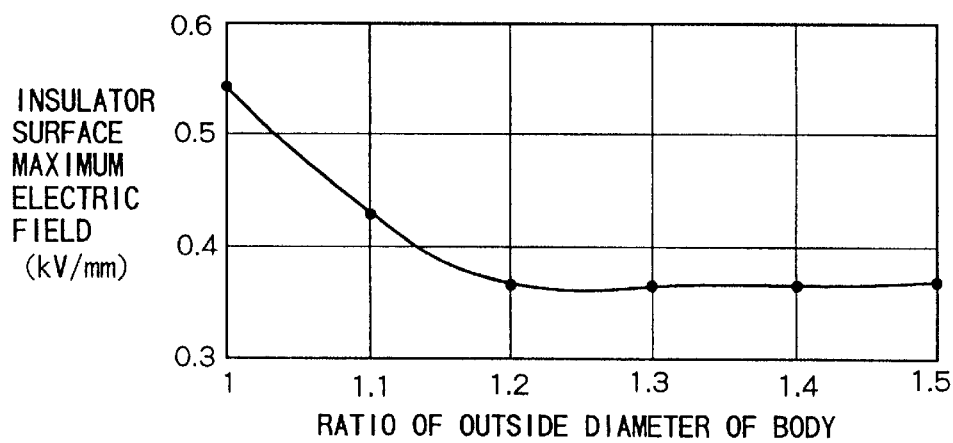
FIG.12

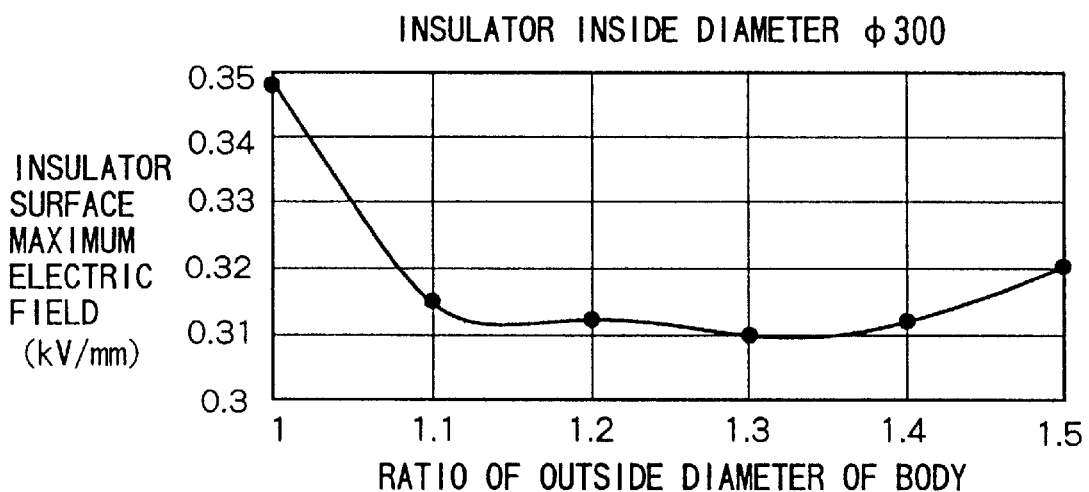
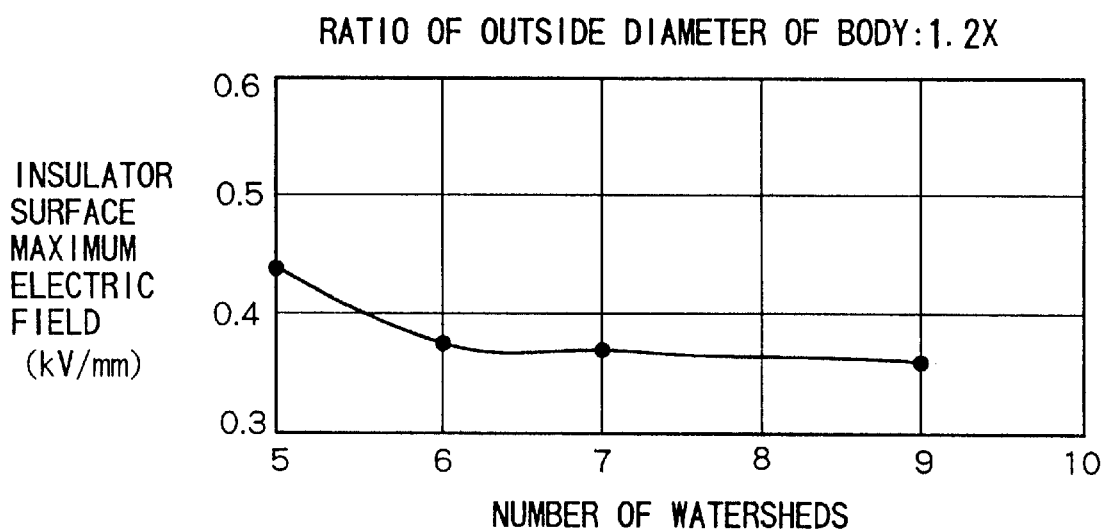

ORGANIC COMPOSITE INSULATOR AND METHOD OF PRODUCING THE SAME

BACKGROUND OF THE INVENTION

1. Field of the Invention

The present invention relates to an organic composite insulator used for a bushing, cable head, etc. and a method of producing the same.

2. Description of the Related Art

FIG. 1 to FIG. 3 are sectional views of organic composite insulation tubes as the related art.

Organic composite insulator tubes shown in FIG. 1 to FIG. 3, are insulator tubes comprised of an FRP tube or other organic material tube 1, voltage application side and ground side end fittings 2, 2' of iron, aluminum, copper, or an alloy of them fastened to the two ends, and an insulator sheath 3 of an organic polymer material such as silicone rubber, EPDM, or EVA molded at the outside of the organic material tube between the two end fittings 2, 2' and parts of the two end fittings 2, 2'. The inside of the organic composite tube is hollow.

The shape is, as shown in FIG. 1 and FIG. 3, that of a straight type of an inside diameter of the pipe portion constant between the top and bottom ends such as an FRP tube or, as shown in FIG. 2, a tapered type of an inside diameter of a bottom larger than an inside diameter of the top.

In both cases, the insulator sheath 3 is comprised of bodies 3-1 and watersheds (projections) 3-2 projected from the bodies. There are cases where it is comprised of watersheds of one type of outside diameter as shown in FIG. 1 and FIG. 2 and cases of large diameter watersheds 3-2' and small diameter watersheds 3-2" as shown in FIG. 3. In the straight type, however, the outside diameter of the watersheds and the outside diameter of the body are formed the same from the top to the bottom.

Therefore, the mold 11 used when molding the organic polymer material on the outside of the organic material tube 1 or the outside of the organic material tube 1 and the outside of parts of the end fittings 2, 2', as shown in FIG. 4, is formed by one or more unit mold portions 12 for forming a uniform body a and watersheds b except for the portions corresponding to the end metal portions 13a and 13b.

In general, in a bushing or cable head, as shown in FIG. 5 and FIG. 6, the equipotential lines 7 concentrate near the tip 6a of the top of an inside electrode 6 for easing the electric field placed between an internal conductor 4 at the ground side end metal fitting 2' and the insulator inside wall 5. The surface electric field of the sheath portion 8 corresponding to the vicinity of the tip 6a of the top of the inside electrode 6 where the equipotential lines 7 cut closest to the surface of the insulator sheath 3 becomes strong. A phenomenon occurs where the air insulation is broken first at this part, then an overall external flashover occurs.

Therefore, if the outside diameter S of the body of the sheath and outside diameters T of the watersheds of this sheath portion 8 are small, the external flashover occurs at a relatively low power voltage, a corona occurs, or the required specifications are not satisfied.

As a means for preventing this phenomenon and weakening the surface electric field of the insulator sheath in the vicinity of the tip 6a of the inside electrode 6 to obtain the required flashover characteristic or corona characteristic, normally an insulator having a sufficiently large inside diameter and outside diameter is selected.

SUMMARY OF THE INVENTION

An object of the present invention is to provide an organic composite insulator and method of production thereof, giving an external flashover characteristic similar to a large inside diameter insulator even if the inside diameter of the insulator is made smaller, enabling a reduction in the cost, and enabling a reduction in size of the insulator.

According to the present invention, there is provided an organic composite insulator comprising: an organic material insulator tube having a hollow portion into which an inside electrode for easing an electric field is inserted; an insulator sheath, a length thereof being shorter than that of the organic material insulator tube, provided on the outer circumference of the organic material insulator tube and having a plurality of body portions and watershed portions alternatively and continuously formed; a first end conductive fitting member fixedly provided on a first end of outer circumference on which the insulator sheath is not provided and on a part of a first end of the insulator sheath, the first end conductive fitting member being applied a voltage; and a second end conductive fitting member fixedly provided on a second end outer circumference on which the insulator sheath is not provided and on a part of a second end of the insulator sheath, the second end conductive fitting member being grounded; the insulator sheath being made of an organic polymer material and having a first insulator sheath, a second insulator sheath and a third insulator sheath continuously aligned from the first end conductive fitting member to the second end conductive fitting member and integraledly formed as a unit, the second insulator sheath being positioned in a vicinity of a top tip of the inside electrode inserted into the hollow portion of the organic material insulator tube from the second end conductive member, and outer diameters S-2 and T-2 of the respective body portion and watershed portion in the second insulator sheath being greater than outer diameters S-1 and T-1 of the respective body portion and watershed portions in the first and/or third insulator sheath.

According to the present invention, there is also provided a method of producing the organic composite insulator, in the method, when the insulator sheath is formed by molding, an assembled mold comprising a plurality of unit molds separated in each unit mold, the unit mold for forming the second insulator sheath having inner diameters for forming the body portions and the watershed portions of the second insulator sheath greater than these of the first and third insulator sheaths.

BRIEF DESCRIPTION OF THE DRAWINGS

These and other objects and features of the present invention will become clearer from the following description of the preferred embodiments given with reference to the accompanying drawings, in which:

FIG. 9 is a graph of results of analysis of the electric field of an insulator of an embodiment of the present invention (insulator length 1700, inside diameter 248, partial outside diameter large);

FIG. 10 is a graph of results of analysis of the electric field of a cable head according to the related art shown in FIG. 8 (insulator length 1700, inside diameter 300);

FIG. 11 is a view of results of analysis of the electric field of a case of uniformly reducing the outside diameter of a body in a cable head according to the related art shown in FIG. 8 (insulator length 1700, inside diameter 248);

FIG. 12 is a view of the relationship between the insulator surface maximum electric field and the ratio of the outside diameter of the body (in case of insulator inside diameter of 248);

FIG. 13 is a view of the relationship between the insulator surface maximum electric field and the ratio of the outside diameter of the body (in case of insulator inside diameter of 300);

FIG. 14 is a view of the relationship between the insulator surface maximum electric field and the number of watersheds (in case of ratio of outside diameter of body: 1.2×)

DESCRIPTION OF THE PREFERRED EMBODIMENTS

Preferred embodiments of the present invention will be described with reference to the accompanying drawings.

First Embodiment

Figure 7:
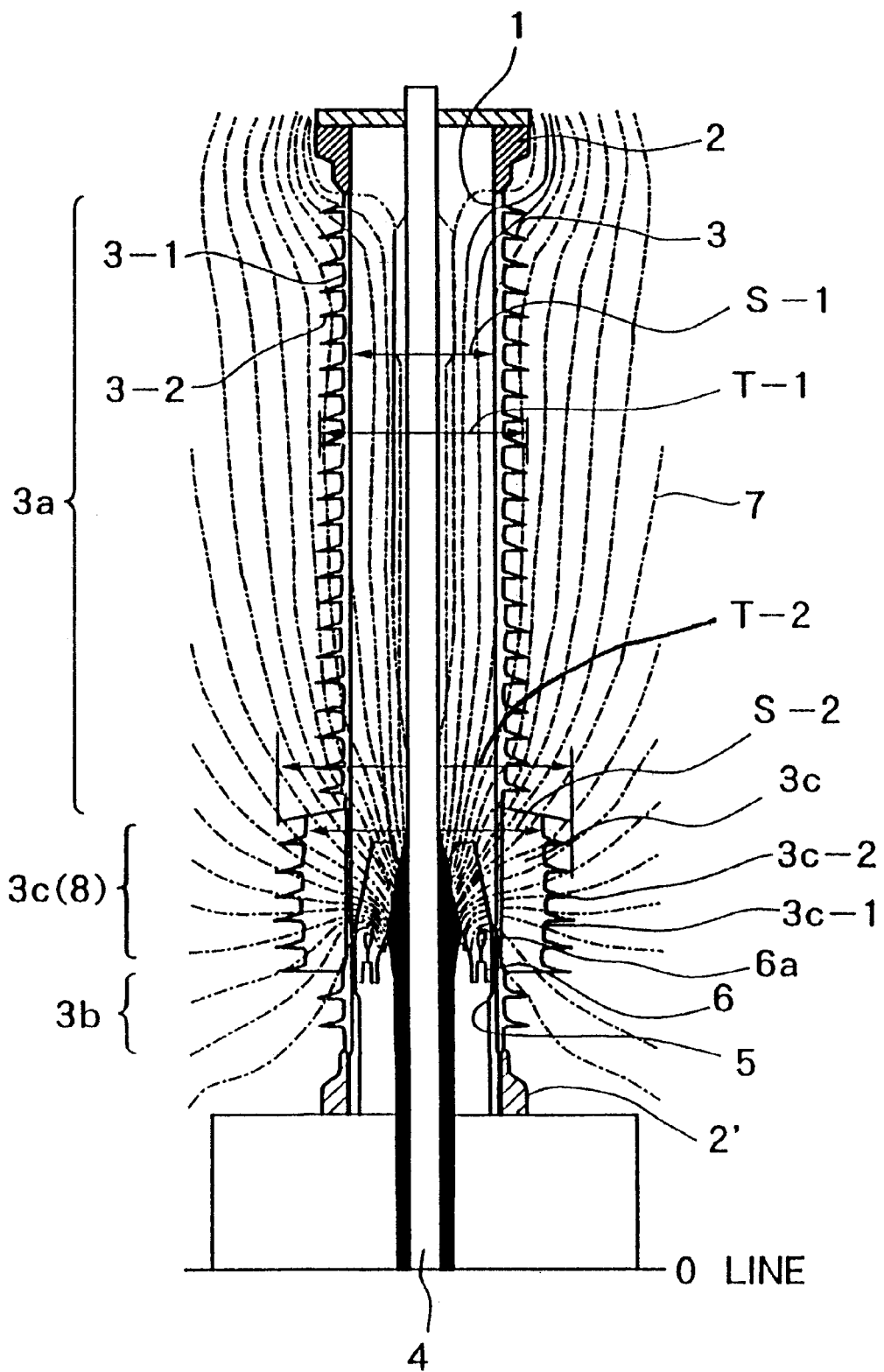
FIG. 7 is a sectional view of an embodiment in the case of application of the present invention to a cable head.

FIG. 7 is a section view of a cable head using an organic composite insulator of an embodiment according to the present invention.

Reference numeral 1 indicates an organic composite insulator tube made of, for example, FRP, 3 an insulator sheath comprised of an organic polymer material, 3-1 its body, 3-2 watersheds, 2' a ground side end metal fitting, and 2 a voltage application side end metal fitting.

The inside of the FRP insulator tube 1 is hollow and an inside electrode 6 for easing the electric field is inserted into the hollow portion.

The insulator sheath 3 is comprised of an upper (first) insulator sheath 3a, an intermediate (second) insulator sheath 3c and a lower (third) insulator sheath 3b. These insulator sheaths 3a, 3b and 3c are integrated as one unit. The insulator sheath 3 is made of an organic polymer material such as silicone rubber, EPDM or EVA.

The intermediate insulator sheath 3c corresponds to an insulator sheath 8 in the vicinity of the top of the inside electrode 6 for easing the electric field.

The insulator sheath 3 is attached around the outer circumference of the FRP insulator tube 1.

The length of the insulator sheath 3 is shorten that of the FRP insulator tube 1. End portions of the FRP insulator tube 1 where the insulator sheath 3 is not attached, are covered by the voltage application side end metal fitting 2 and the ground side end metal fitting 2'. The fittings 2, 2' are fixed on the end portions of the FRP insulator tube 1 and the parts of the insulator tube 3 lose to the end portions of the FRP insulator tube 1.

The voltage application side and the ground side end metal fittings 2, 2' are made of conductive material such as iron, aluminum, copper or an alloy of them.

Reference numeral 4 indicates an internal conductor, 5 an insulator inside wall, 6 the inside electrode for easing the electric field, 6a a tip of the inside electrode 6, and 8 an insulator sheath in the vicinity of the top of the inside electrode 6 where the equipotential lines 7 concentrate. The portion of the insulator sheath 8 in the vicinity of the top of the inside electrode 6 corresponds to the intermediate insulator sheath 3c having an outside diameter S-2 of the body 3c-2 and outside diameter T-2 of the watersheds 3c-1 larger than the outside diameter S-1 of the body and the outside diameter T-1 of the watersheds of the upper (first) and lower (third) insulator sheaths 3a and 3b.

The outside diameter S-1 of the body and outside diameter T-1 of the watersheds of the upper (first) insulator sheath 3a are same as those of the lower (third) insulator sheath 3b.

Figure 8:
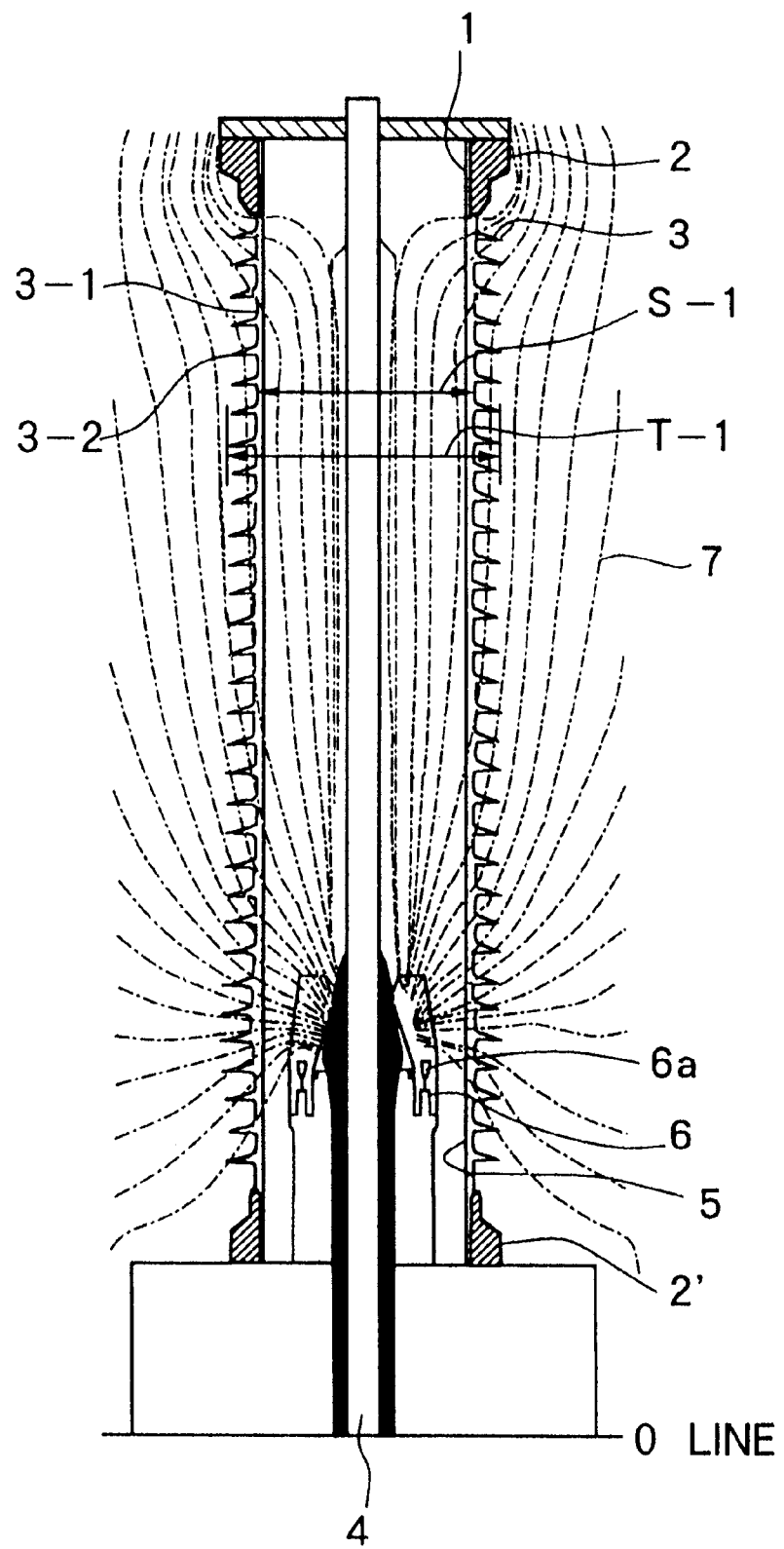
FIG. 8 is a sectional view of the structure and equipotential lines of a cable head according to the related art.

FIG. 8 is a sectional view of a cable head using an organic composite insulator tube made of, for example, FRP of the related art. Portions illustrated in FIG. 7 are the same as those shown in FIG. 7 and are assigned the same reference numerals. The FRP insulator tube shown in FIG. 8 has not the intermediate insulator sheath 3c of the FRP insulator tube 1 shown in FIG. 7.

In the insulator tube of the present embodiment shown in FIG. 7, since the outside diameter S-2 of the body and outside diameter T-2 of the watersheds of the insulator sheath 8 in the vicinity of the top of the inside electrode 6 are larger than the diameters of the upper and lower insulator sheaths 3a and 3b portions. The electric field of the sheath surface in the vicinity of the tip 6a of the inside electrode 6 is weakened and the maximum surface electric field portion shifts from the sheath surface in the vicinity of the tip 6a of the inside electrode 6 in the direction of the voltage application side end metal fitting 2 compared with the insulator tube in FIG. 8.

FIG. 9 and FIG. 10 are graphs showing the insulator surface absolute electric fields of the insulator tube of the present embodiment of FIG. 7 and insulator tube of FIG. 8.

In FIG. 9 and FIG. 10, the abscissa indicates the distance (mm) from the insulator tube bottom in the longitudinal direction of the insulator tube, while the ordinate indicates the insulator surface absolute electric field (kV/mm). The "0" of the abscissa shown in FIG. 9 and FIG. 10 indicate the 0 lines in FIG. 7 and FIG. 8 and show respectively the case of a length of the insulator tube of 1700 mm and a reference voltage of 93 kV.

FIG. 10 shows the sheath surface electric field distribution in the longitudinal direction of the insulator tube in the insulator tube shown in FIG. 8 and shows the sheath surface electric field distribution in the case of an inside diameter of the FRP insulator tube of 300 mm and an outside diameter S-1 of the body of 316 mm.

As shown in FIG. 10, in the insulator tube of FIG. 8, the sheath surface maximum electric field A is 0.35 kV/mm generated at the insulator sheath 8 in the vicinity of the tip 6a of the top of the inside electrode 6.

On the other hand, the sheath surface electric field distribution of the insulator tube of the embodiment of FIG. 7 becomes as shown in FIG. 9 if shown along the longitudinal direction of the insulator tube.

FIG. 9 shows the sheath surface electric field distribution in the case of an inside diameter R of the FRP insulator tube of 248 mm or smaller than the 300 mm in the case of FIG. 8, an outside diameter S-2 in the vicinity of the tip 6a of the top of the inside electrode of 369 mm, an outside diameter S-1 of the body at the upper and lower insulator sheaths 3a and 3b of 264 mm, and a projecting length of the watersheds 3c-1 from the body 3c-2 the same as that of the insulator tube of an inside diameter of 300 mm.

As shown in FIG. 9, in the insulator tube of the present embodiment, the sheath surface maximum electric field A becomes 0.37 kV/mm. That is, the sheath surface maximum electric field of the insulator tube of the present embodiment becomes equal to that of the insulator tube of FIG. 8 larger in inside diameter of the FRP insulator tube and outside diameter of the body than the present embodiment (inside diameter of FRP tube of 300 mm and outside diameter of body of 316 mm, FIG. 10).

Further, as shown in FIG. 9, the location B exhibiting the sheath surface maximum electric field moves in the insulator tube longitudinal direction to the right side of the portion C where the outside diameter of the body and outside diameter of the watersheds are made larger, that is, to the top side of the insulator tube (a part of the upper sheath insulation 3a in FIG. 7).

Therefore, in FIG. 7, the initial air dielectric breakdown occurs at the part of the upper insulator sheath 3a where the maximum electric field occurs. But, since the outside diameters T-2 and S-2 of the watersheds 3c-1 and body 3c-2 of the intermediate insulator sheath 3c at the bottom of the insulator tube 1 are larger than the outside diameters T-1 and S-1 of the watersheds 3-1 and body 3-2 of the part of the upper insulator sheath 3a, the intermediate insulator sheath 3c of the large diameter portion acts as a block preventing the spread of the dielectric breakdown occurring at the part of the upper insulator sheath 3a to the ground side end metal fitting 2'.

In this embodiment, since only the outside diameters of the body and watersheds of the intermediate insulator sheath 3c in the vicinity of the tip 6a of the inside electrode 6 are made larger than the upper and lower insulator sheaths 3a and 3b, the sheath surface maximum electric field becomes about the same as the case where the outside diameter of the FRP insulator tube is made larger without making the inside diameter of the FRP insulator tube larger. Further, the part where the maximum electric field arises is moved up from the portion where the outside diameters of the body and watersheds are made larger on the insulator tube. As a result, the portion of the large outside diameters of the intermediate insulator sheath 3c has the effect of blocking the spread of air dielectric breakdown to the ground side end metal fitting 2'. Therefore, a flashover characteristic and corona characteristic the same as those of the insulator tube with a large inside diameter of the FRP insulator tube are obtained.

In the other words, the FRP insulator tube 1 of FIG. 7 smaller than the FRP insulator tube of FIG. 8 provides the same flashover characteristic and corona characteristic, and thus a production cost of the FRP insulator tube 1 of FIG. 7 may be reduced than that of the FRP insulator tube of FIG. 8. Also, small sized FRP insulator tube 1 of FIG. 7 has many advantages, such as an easy installation.

The length in the vertical direction and outside diameter of the intermediate insulator sheath 3c of the large outside diameter should be selected to a length and outside diameter so that the electric field intensity of the sheath surface in the vicinity of the tip 6a of the inside electrode 6 does not first cause air dielectric breakdown at the intermediate insulator sheath 3c.

As shown in the later explained FIG. 12 and FIG. 13, the outside diameter of the body of the intermediate insulator sheath 3c need greater than 1.1 times and only be not more than 1.4 times the outside diameter of the body of the upper and lower insulator sheaths 3a and 3b. The outside diameter of the watersheds of the intermediate insulator sheath 3c may be the outside diameter of the body plus the difference in the outside diameter of the watersheds and outside diameter of the body at the upper and lower insulator sheaths 3a and 3b. On the other hand, the length need greater than 270 mm and only be not more than 400 mm as shown in the later explained FIG. 14.

By increasing the outside diameters of the sheath body and watersheds of the intermediate insulator sheath 3c than those of the upper and lower insulator sheaths 3a and 3b, the electric field of the sheath surface in the vicinity of the tip 6a of the top of the inside electrode 6 exhibiting the maximum electric field in the insulator tube of FIG. 8 is weakened and the maximum electric field part is moved to the upper insulator sheath 3a positional upper of the intermediate insulator sheath 3c having the enlarged outside diameters. Since the new maximum electric field is originally positioned away from the tip 6a of the top of the inside electrode 6, it is weaker than the maximum electric field of the sheath surface of the vicinity of the tip 6a of the top of the inside electrode 6 of the insulator tube of FIG. 8. Further, the initial air dielectric breakdown leading to external flashover occurs at the new maximum electric field part at the upper insulator sheath 3a, but the voltage where the dielectric breakdown occurs becomes higher.

Further, the large outside diameters of watersheds and body at the intermediate insulator sheath 3c are between the new maximum electric field part at the upper insulator sheath 3a and the ground side end metal fitting 2', so also act to block the propagation of the air dielectric breakdown occurring at the new maximum electric field part to the ground side end metal fitting 2' and exhibit the effect of increasing the external flashover voltage.

Even if the organic composite insulator tube 1 of the embodiment according to the present invention is used for a bushing, the exact same thing can be said as with the example of the above cable head.

Second Embodiment

FIG. 11 is a graph showing the sheath surface electric field distribution in the case of the structure of FIG. 8 of the related art design where the inside diameter R of the FRP insulator tube is made the same as in FIG. 9, that is, Φ248 mm, and the outside diameter S of the body is made a thin uniform Φ264 mm. In this case, it is learned that the sheath surface maximum electric field A becomes 0.54/ kVmm or remarkably higher compared with FIG. 9 and how much lower the external flashover voltage becomes when the outside diameters of the body and watersheds are made uniform over the insulator tube as a whole.

Third Embodiment

FIG. 12 and FIG. 13 are graphs of characteristics of straight type insulator tubes of an inside diameter R of the FRP insulator tube of Φ248 mm and outside diameter S-1 of the body of Φ264 mm and of an inside diameter R of Φ300 mm and outside diameter S-1 of the body of Φ316 mm, respectively, showing the ratio of the outside diameter of the body: (S-2)/(S-1) ratio, in the case of changing the outside diameter S-2 of the body in the vicinity of the tip 6a of the top of the inside electrode 6 on the abscissa and the maximum electric field arising on the sheath surface at that time on the ordinate.

As seen from the graph, if the outside diameter of the body in the vicinity of the tip 6a of the top of the inside electrode 6 is made greater than 1.1 times, preferably 1.2 times and not more than 1.4 times the outside diameter of the bodies of the upper and lower insulator sheaths 3a and 3b, the shealth surface maximum electric field can be sufficiently fall.

Fourth Embodiment

FIG. 14 is a graph showing the change in the shealth surface maximum electric field in the case of making the outside diameter of the body in the vicinity of the tip 6a of the top of the inside electrode 6, 1.2 times the outside diameter of the body at the upper and lower insulator sheaths 3a and 3b and changing the length of the intermediate insulator sheath 3c where the outside diameter of the body is made larger. Further, in this graph, the length of the portion where the body is made thicker is expressed by the number of watersheds, but the pitch between watersheds is 45 mm, so the length is obtained by multiplying the number by 45 mm. In general, the greater the ratio of the outside diameter of the body, the further the sheath surface from the inside electrode 6, so the shorter the length of the intermediate insulator sheath 3c where the outside diameter of the body is made larger. Therefore, from FIG. 14, it can be said that a sufficient reduction of the maximum electric field is possible with a length of the intermediate insulator sheath 3c where the outside diameter of the body is made larger in the vicinity of the tip 6a of the top of the inside electrode 6 of not more than 400 mm (not less than 270 nm).

Above, the configuration and effects of the embodiments of the present invention were shown by the example of a cable head, but a similar effect can be expected by a similar configuration even in the case of a bushing.

Further, the above embodiments were shown relating to a straight type with a uniform inside diameter of the FRP insulator tube across the entirety of the insulator tube, but a similar effect can be obtained as in the above embodiments even with a tapered type.

Fifth Embodiment

Figure 1:
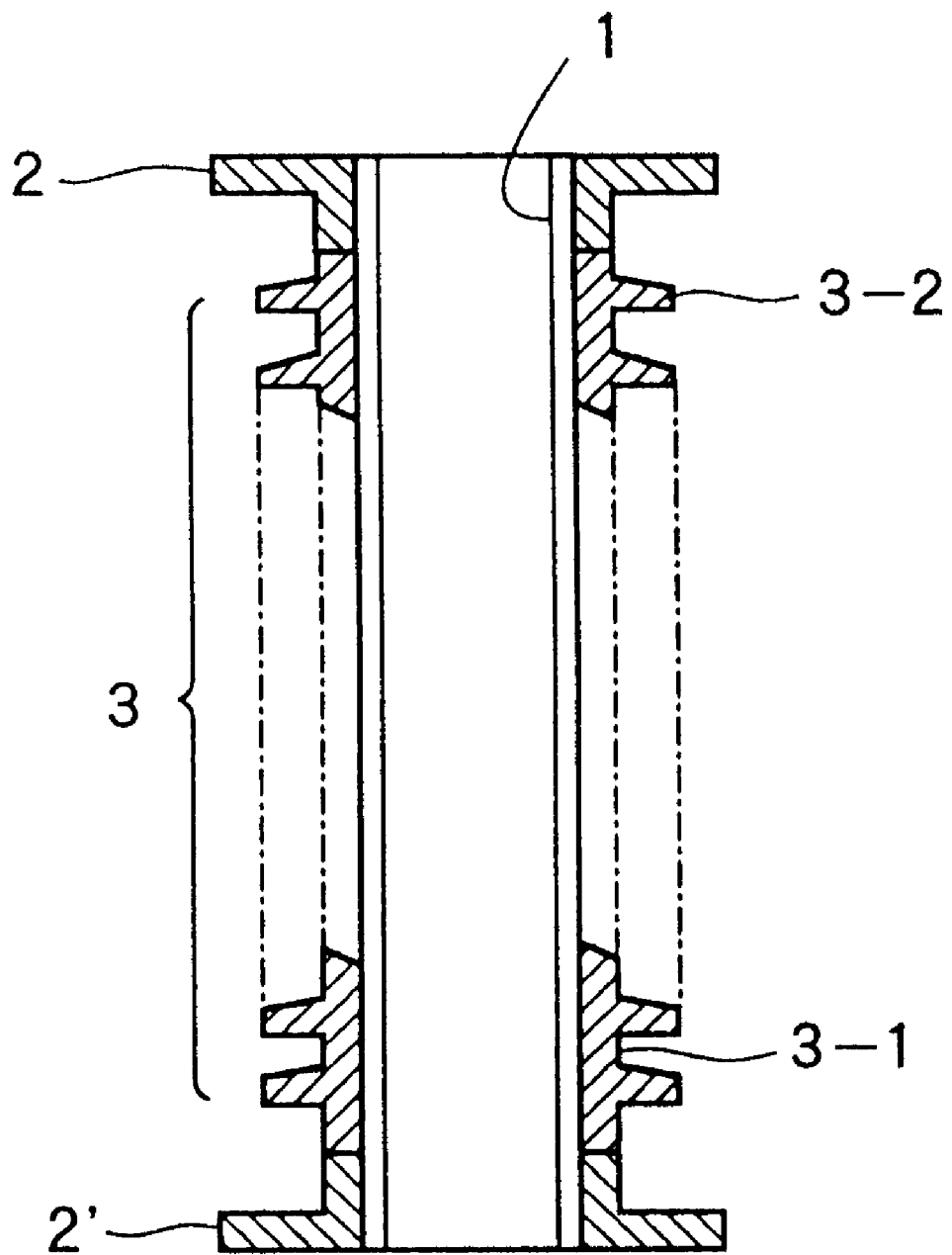
FIG. 1 is a view of the cross-section of an organic composite insulator (straight type)
Figure 2:
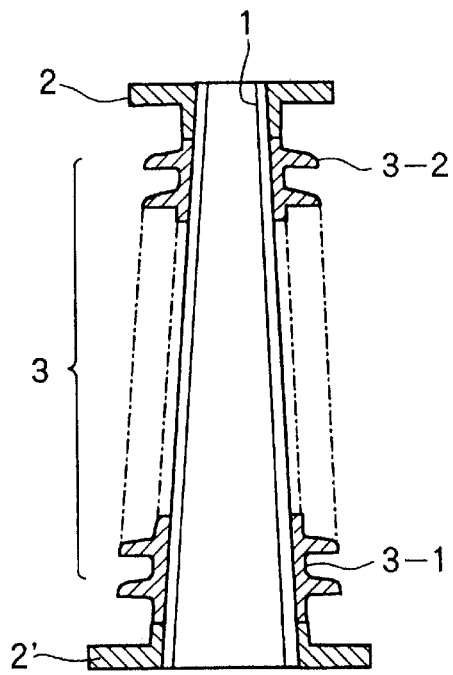
FIG. 2 is a view of the cross-section of an organic composite insulator (tapered type)
Figure 3:
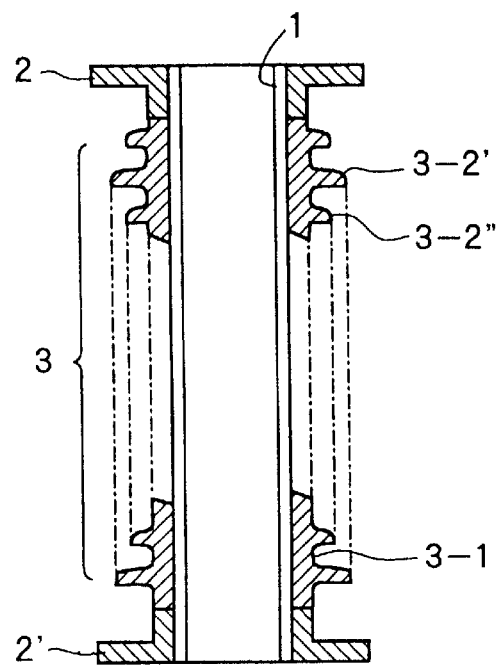
FIG. 3 is a view of the cross-section of the organic composite insulator comprised of large diameter and small diameter watersheds.
Figure 4:
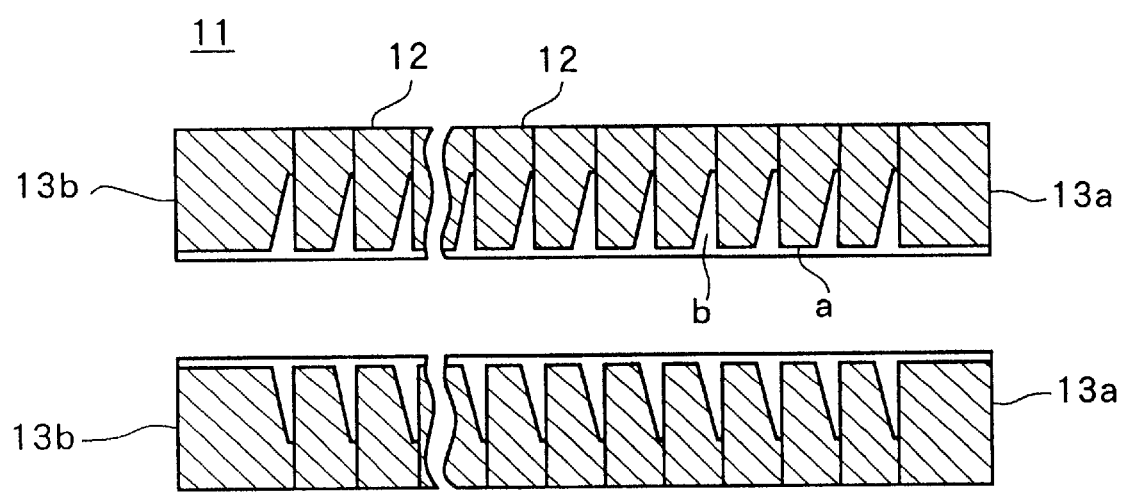
FIG. 4 is a view of an example of a mold for producing an insulator of the related art of structure.
Figure 5:
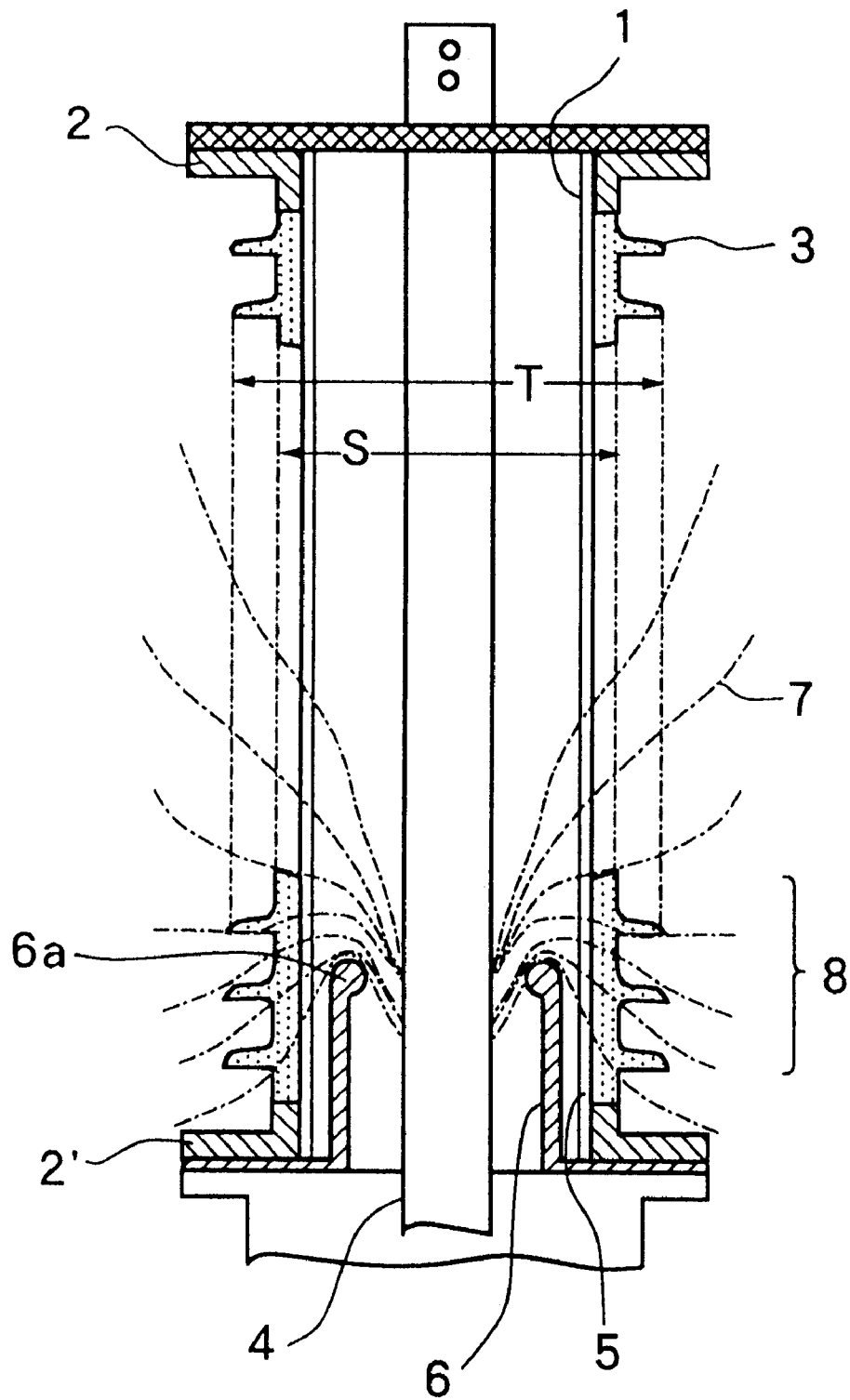
FIG. 5 is a view of the cross-section and equipotential lines of a gas bushing made from an organic composite insulator.
Figure 6:
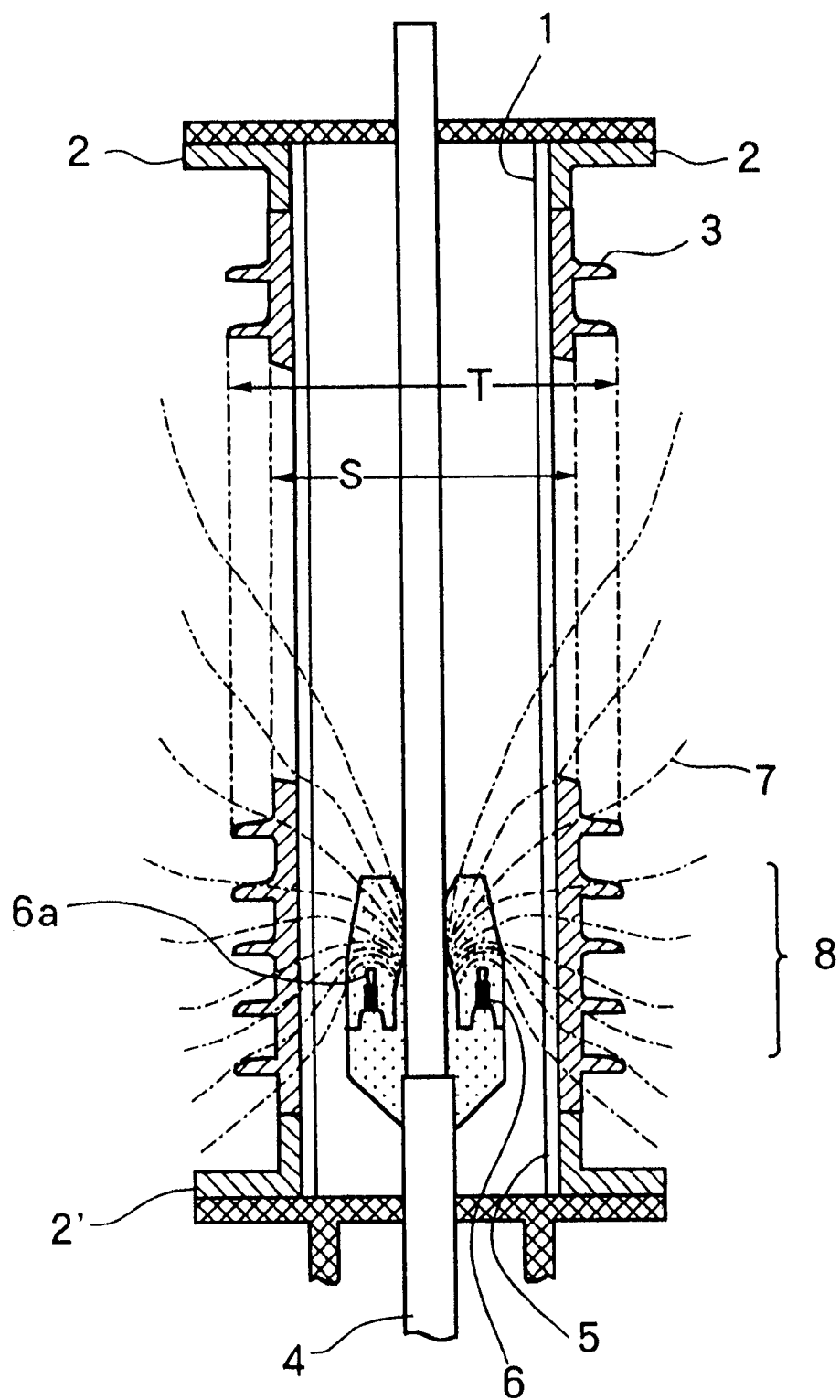
FIG. 6 is a view of the cross-section and equipotential lines of a cable head made from an organic composite insulator.
Figure 15:
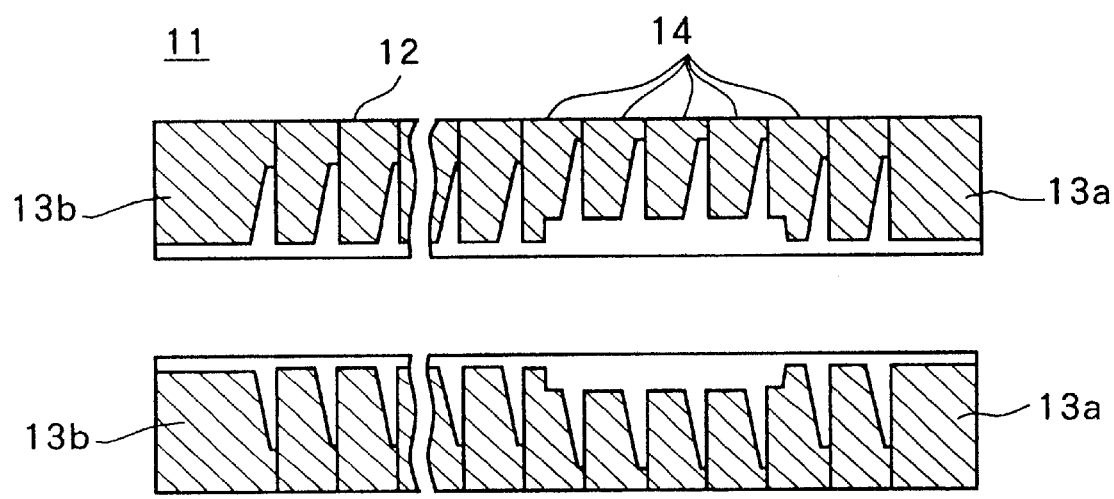
FIG. 15 is a view of an example of a mold for producing the insulator of the present invention.

The means for producing the organic composite insulator tube such as shown in FIG. 7, having an outside diameter made larger at only part of the watersheds and body of the insulator sheath in the present embodiment is to replace part of the mold 11 shown in FIG. 4 with molds with a large outside diameter as shown in FIG. 15.

That is, as shown in FIG. 15, the mold 11 is made a composite type mold comprised of a plurality of unit molds 12 forming the body and watersheds and molds 13a and 13b forming the ends. Part 14 of the plurality of molds forming the body and watersheds in them is replaced with molds having larger outside diameters.

Further, it is possible to use the above molds to produce the insulator tube of the embodiments by molding the insulator sheath by silicone rubber, EPDM, EVA, etc.

Due to this, it is possible to produce an organic composite insulator tube having outside diameters of the body and watersheds of the organic polymer material sheath insulator larger than the outside diameters of other locations.

As explained above, in the present invention, there is provided an organic composite insulator (tube) used for a bushing or cable head wherein the outside diameters of the body and watersheds of the insulator sheath in the vicinity of the tip of the inside electrode for easing the electric field where the maximum electric field appears at the surface of the insulator sheath are made larger than the outside diameters above and below, so there is the effect of weakening the electric field of the portion in the vicinity of the tip of the inside electrode and it is possible to move the part where the maximum electric field appears to a position offset to the top side of the portion where the outside diameters of the watersheds and body are made larger and the propagation of the air dielectric breakdown occurring at the new maximum electric field part to the ground side end fitting member can be blocked. Therefore, even if the inside diameter of the insulator (tube) is made smaller, an external flashover characteristic and corona characteristic similar to those of an insulator (tube) of a large inside diameter can be obtained.

Due to this, it is possible to obtain the effects of being able to reduce the cost of the insulator (tube), being able to reduce the size of the insulator (tube), and being able to reduce the price of the parts and other materials when used for a bushing or cable head.

Note that the present invention is not limited to the above embodiments and includes modifications within the scope of the claims.

What is claimed is:

1. An organic composite insulator comprising:
an organic material insulator tube having a hollow portion into which an inside electrode for easing an electric field is inserted;
an insulator sheath, a length thereof being shorter than that of the organic material insulator tube, provided on the outer circumference of the organic material insulator tube and having a plurality of body portions and watershed portions alternatively and continuously formed;
a first end conductive fitting member fixedly provided on a first end of outer circumference on which the insulator sheath is not provided and on a part of a first end of the insulator sheath the first end conductive fitting member being applied a voltage; and
a second end conductive fitting member fixedly provided on a second end outer circumference on which the insulator sheath is not provided and on a part of a second end of the insulator sheath, the second end conductive fitting member being grounded;
the insulator sheath being made of an organic polymer material and having a first insulator sheath, a second insulator sheath and a third insulator sheath continuously aligned from the first end conductive fitting member to the second end conductive fitting member and integrally formed as a unit,
the second insulator sheath being positioned in a vicinity of a top tip of the inside electrode inserted into the hollow portion of the organic material insulator tube from the second end conductive member, and
outer diameters of the respective body portion and watershed portion in the second insulator sheath being greater than outer diameters of the respective body portion and watershed portions in the first and third insulator sheath.

2. An organic composite insulator according to claim 1, wherein a length and the outer diameters of the body portion and the watershed portion of the second insulator sheath are defined as values where the electric field strength at the outer sheath in the vicinity of the top tip of the inside electrode inserted into the hollow portion of the organic insulator tube does not cause an air insulation breakage at the second insulator sheath.

3. An organic composite insulator according to claim 2, wherein a ratio S-2/S-1 of the outer diameter S-2 of the body portion of the second insulator sheath and the outer diameter of the body portion of the first or second insulator sheath is within a range from 1.1 to 1.4.

4. An organic composite insulator according to claim 3, where the outer diameter of the watershed of the second insulator sheath is determined as a summation value of the outer diameter of the body portion of the second insulator sheath and a difference between the outer diameter of the watershed portion and the outer diameter of the body portion of the first or third insulator sheath.

5. An organic composite insulator according to claim 2, wherein the length of the second insulator sheath is within 270 to 400 mm.

6. An organic composite insulator according to claim 5, the number of pairs of the body portion and the watershed portion in the second insulator sheath is 6 to 9.

7. An organic composite insulator according to claim 1, wherein the organic polymer material insulator sheath is formed by molding using a mold.

8. An organic composite insulator according to claim 1, wherein the outer diameters of the body portion and the watershed portion of the first insulator sheath are equal to those of the third insulator sheath.

9. An organic composite insulator according to claim 1, wherein the outer diameters of the body portion and the watershed portions are increased from those in the first insulator sheath toward those in the third insulator sheath in a predetermined rate.

10. An organic composite insulator according to claim 9, wherein the outer diameters of the body portions and the watershed portions of the first and third insulator sheaths are equal.

* * * * *